(12) United States Patent
Glenn et al.

(10) Patent No.: US 11,339,275 B2
(45) Date of Patent: May 24, 2022

(54) COMPOSITIONS AND METHODS FOR FOOD PACKAGING

(71) Applicants: The United States of America, as represented by the Secretary of Agriculture, Washington, DC (US); World Centric, Petaluma, CA (US)

(72) Inventors: Gregory M. Glenn, American Canyon, CA (US); Xing Jin, Albany, CA (US)

(73) Assignees: The United States of America, as represented by the Secretary of Agriculture, Washington, DC (US); World Centric, Petaluma, CA (US)

( * ) Notice: Subject to any disclaimer, the term of this patent is extended or adjusted under 35 U.S.C. 154(b) by 193 days.

(21) Appl. No.: 16/144,503

(22) Filed: Sep. 27, 2018

(65) Prior Publication Data

US 2019/0092931 A1    Mar. 28, 2019

Related U.S. Application Data

(60) Provisional application No. 62/564,555, filed on Sep. 28, 2017.

(51) Int. Cl.
| | |
|---|---|
| *C08L 3/02* | (2006.01) |
| *B29B 15/08* | (2006.01) |
| *B29B 13/02* | (2006.01) |
| *B29C 70/02* | (2006.01) |
| *C08L 29/04* | (2006.01) |
| *C08L 1/28* | (2006.01) |
| *B29L 31/00* | (2006.01) |
| *B29K 505/00* | (2006.01) |
| *B29K 509/02* | (2006.01) |
| *B29K 509/08* | (2006.01) |
| *B29K 509/10* | (2006.01) |

(52) U.S. Cl.
CPC ............... *C08L 3/02* (2013.01); *B29B 13/02* (2013.01); *B29B 15/08* (2013.01); *B29C 70/02* (2013.01); *C08L 29/04* (2013.01); *B29K 2003/00* (2013.01); *B29K 2505/00* (2013.01); *B29K 2509/02* (2013.01); *B29K 2509/08* (2013.01); *B29K 2509/10* (2013.01); *B29L 2031/712* (2013.01); *C08L 1/286* (2013.01)

(58) Field of Classification Search
None
See application file for complete search history.

(56) References Cited

U.S. PATENT DOCUMENTS

| | | | | |
|---|---|---|---|---|
| 5,639,518 A * | 6/1997 | Ando | ...................... | B29C 35/12 427/544 |
| 5,849,152 A * | 12/1998 | Arnold | ..................... | C08J 5/045 162/116 |
| 6,022,450 A * | 2/2000 | Van Kessel | ............ | D21H 17/22 162/174 |
| 6,494,991 B1 * | 12/2002 | Palmer | ................... | D21H 17/68 162/158 |

(Continued)

*Primary Examiner* — Stefanie J Cohen
(74) *Attorney, Agent, or Firm* — John D. Fado; Maria Restrepo-Hartwig

(57) ABSTRACT

Compositions comprising a fiber component, optionally a dispersing agent operable to disperse the fiber component to create a fiber matrix, a starch component distributed essentially throughout the fiber matrix, and a filler component are disclosed. Methods of forming articles such as containers and packages from such compositions are also disclosed.

17 Claims, 2 Drawing Sheets

(56) References Cited

U.S. PATENT DOCUMENTS

| | | | | |
|---|---|---|---|---|
| 7,332,214 | B2* | 2/2008 | Ozasa | B65D 65/466 |
| | | | | 428/317.1 |
| 8,187,423 | B1* | 5/2012 | Glenn | E04C 2/22 |
| | | | | 162/181.8 |
| 2005/0202229 | A1* | 9/2005 | Ozasa | B65D 65/466 |
| | | | | 428/304.4 |
| 2011/0227254 | A1* | 9/2011 | Reck-Glenn | C08L 1/02 |
| | | | | 264/328.17 |
| 2013/0256579 | A1* | 10/2013 | Lobo Morales | C04B 28/16 |
| | | | | 252/62 |
| 2017/0058109 | A1* | 3/2017 | Nguyen | C08L 3/02 |

* cited by examiner

COMPOSITIONS AND METHODS FOR FOOD PACKAGING

CROSS REFERENCE TO RELATED APPLICATION

This application claims priority to U.S. Provisional Patent Application Ser. No. 62/564,555 filed Sep. 28, 2017, the content of which is incorporated herein by reference in its entirety.

FIELD OF THE INVENTION

The present invention relates to starch-containing compositions and methods of making such compositions. More particularly the present invention relates to starch-containing compositions and methods of making articles such as containers and packages from such compositions.

BACKGROUND OF THE INVENTION

Containers and other packaging materials are generally designed to protect items from external damage (e.g., moisture, impacts, crushes, vibration, leakage, spills, gases, light, extreme temperatures, contamination, animal and insect intrusion, etc.) and may also contain information about the items therein. For example, containers and packages designed for use in the food and beverage industries are widely used throughout the world. The concept of single-use food and beverage containers as an inexpensive, sanitary, and convenient alternative to reusable types has increased nearly fivefold since 1960. The value of single-use food and beverage containers in safeguarding human health and improving hygiene is often lost in the discussion of its role as a convenience and as a significant source of pollution and municipal solid waste. Plastics (e.g., polystyrene, polyethylene terephthalate, polypropylene, high-density polyethylene, low-density polyethylene, polycarbonate, etc.) are commonly used and offer the benefit of ease of manufacturing, light weight, low cost, and inherent moisture and oil resistance. Polystyrene is a commonly used plastic in making disposable plates and cups. In 2012, it was estimated that 0.83 MMT of polystyrene plates and cups were used and discarded as municipal waste (see e.g., EPA, U., Municipal Solid Waste Generation, Recycling, and Disposal in the United States: Facts and Figures for 2012).

Efforts have been made to reduce the environmental footprint of disposable food and beverage packaging because very little of the food and beverage packaging is typically re-used or recycled. Interest in sustainable solutions has led to the development of products made from renewable materials including poly(lactic acid) and poly(hydroxybutyrate), among others, which continue to be pursued as sustainable materials for food and beverage containers (see e.g., Farah, S., et al., *Advanced drug delivery reviews* 2016, 107, 367-392; Widiastuti, I., et al, In Polylactide nanocomposites for packaging materials: A review, AIP Conference Proceedings, 2016; AIP Publishing: 2016; p 030020; Musioł M., et al., *European Food Research and Technology* 2016, 242, 815-823; Arrieta, M., et al., Nanocellulose-Based Polymeric Blends for Food Packaging Applications. Multifunctional Polymeric Nanocomposites Based on Cellulosic Reinforcements 2016, 205).

Starch-based materials also continue to be investigated as a viable candidate for sustainable bio-based products (see e.g., Khan, B., et al., Thermoplastic Starch: A Possible Biodegradable Food Packaging Material—A Review. Journal of Food Process Engineering 2017, 40, e124476; Zhang, Y., et al., Thermoplastic Starch Processing and Characteristics—A Review. Critical Review in Food Science and Nutrition 2014, 54, 1353; Avérous L. & Halley P. J., Biocomposites based on plasticized starch. Biofuels, Bioprod. Bioref. 2009, 3, 329-343; Liu H., et al., Thermal processing of starch-based polymers, Progress in Polymer Science, 2009, 34 1348-1368; Glenn, G.; Orts, W. & Nobes, G., Starch, fiber and $CaCO_3$ effects on the physical properties of foams made by a baking process. Industrial Crops and Products 2001, 14, 201-212). As a major component of many commodity grains such as corn and wheat and tubers such as potato, starch is typically in the form of granules that can be separated and collected into a relatively pure fraction that is inexpensive and widely available. Starch can be processed, for example, as a thermoplastic when plasticizers are added, extruded into foam materials that are used commercially as packing products, extruded into sheets/films, or injection molded into a defined shape. Starch may also be subjected to a baking process by first preparing a slurry of water, starch, plant fibers, and other food additives to create a dough which is then baked in a heated mold to gelatinize the starch and off-gas the moisture in the form of steam. Such processes typically involve making a low-viscosity dough that flows and is pumped through lines and injected into molds. Commonly, the moisture content is excessively high and requires that the dough be heated for extended periods to sufficiently remove the water and solidify the molded article within the mold. The excessively long cycle time restricts the production capacity and increases costs.

The molded part is then removed from the mold and coated with a barrier film to confer moisture and oil resistance, both important characteristics in functional food containers (see e.g., Shogren, R.; Lawton, J.; Tiefenbacher, K., Baked starch foams: starch modifications and additives improve process parameters, structure and properties. Industrial Crops and products 2002, 16, 69-79; Tiefenbacher, K. F., Starch-based foamed materials—use and degradation properties. Journal of Macromolecular Science, Part A: Pure and Applied Chemistry 1993, 30, 727-731; U.S. Pat. No. 5,576,049). Although the baking process can form functional starch-based food containers using renewable, inexpensive ingredients, the processing cost is prohibitively expensive due to the high energy input required bake-off all the water contained in the dough and the excessively long cycle times (i.e., the time to complete a production cycle before starting the next cycle, which typically exceeds 60 sec whilst cycle times for many plastic food service items are less than 10 sec).

There thus exists an industrial need to develop improved compositions and methods for making food and beverage containers and packaging. A particular need exists to improve the efficiency and minimize cycle times for starch-based compositions for use in food and beverage container applications and methods of making such compositions.

SUMMARY OF THE INVENTION

To address these challenging issues in starch-based compositions used for making articles, economical and commercially efficient compositions and methods of making compositions for use in the production of starch-based articles is disclosed. In conventional methods, drying a molded article in a mold for long periods (e.g., 60 to 200 seconds) places burdensome limits on the production rate and increases costs. In the present invention, starch dough compositions are disclosed that allow production of articles with short cycle times as compared to conventional compositions and methods. In addition, the present invention may employ existing production equipment which enhances its cost-effectiveness.

In an aspect, the invention is a composition comprising a fiber component; optionally a dispersing agent operable to disperse the fiber component to create a fiber matrix; a starch component distributed essentially throughout the fiber matrix; and a filler component; wherein the fiber component, the dispersing agent, the starch component, and the filler component combine to form a starch dough product. In a further aspect, the invention is a method for making a starch dough composition. The method includes shredding a fiber component to create a shredded fiber component; mixing the shredded fiber component with a dispersing agent to create a dispersed fiber; adding a starch component to the dispersed fiber and mixing to create a starch-containing dispersed fiber; heating the starch-containing dispersed fiber for a sufficient time and temperature to create a gelatinized starch mixture; adding a filler component to the gelatinized starch mixture to create a filled mixture; mixing the filled mixture followed by heating for a sufficient time at a sufficient temperature and mixing again to create a starch dough product; and optionally portioning or rolling the starch dough product for subsequent processing.

It is an advantage of the invention to provide compositions and methods for making articles which have reduced moisture content resulting in decreased cycle times through the molding process.

It is also an advantage of the invention to provide compositions and methods including starch-containing formulations with a starch content level which improves their biodegradation rate in many environments.

It is another advantage of the present invention to provide compositions and methods that partially or wholly include formulations that substitute fibers from crop waste to create sustainable products with a lower environmental footprint than conventional products.

It is a further advantage of the present invention to provide compositions and methods which reduce drying times for starch-containing molded products allowing for increased throughput.

It is yet another advantage of the present invention to provide compositions and methods that due to lower moisture content in the starch-containing dough reduce the likelihood of molded articles adhering to inner surfaces of molds.

Another advantage of the present invention to minimize the cycle times including the amount of time the starch-containing dough spends inside a mold which typically constitutes the production rate-limiting step so as to maximize production rates.

An additional advantage of the invention is to provide compositions and methods where the fibers within viscous starch-containing formulations remain dispersed throughout the matrix and do not agglomerate or separate during processing.

A further advantage of the invention is to provide compositions and methods amenable to large scale production using conventional or readily modified high-production rate and other equipment used for calendaring, papermaking, or thermoforming preventing the need to design and construct customized production equipment.

This summary is provided to introduce a selection of concepts in a simplified form that are further described below in the detailed description. This summary is not intended to identify all key or essential features of the claimed subject matter, nor is it intended as an aid in determining the scope of the claimed subject matter.

DETAILED DESCRIPTION OF THE INVENTION

Figure 1:
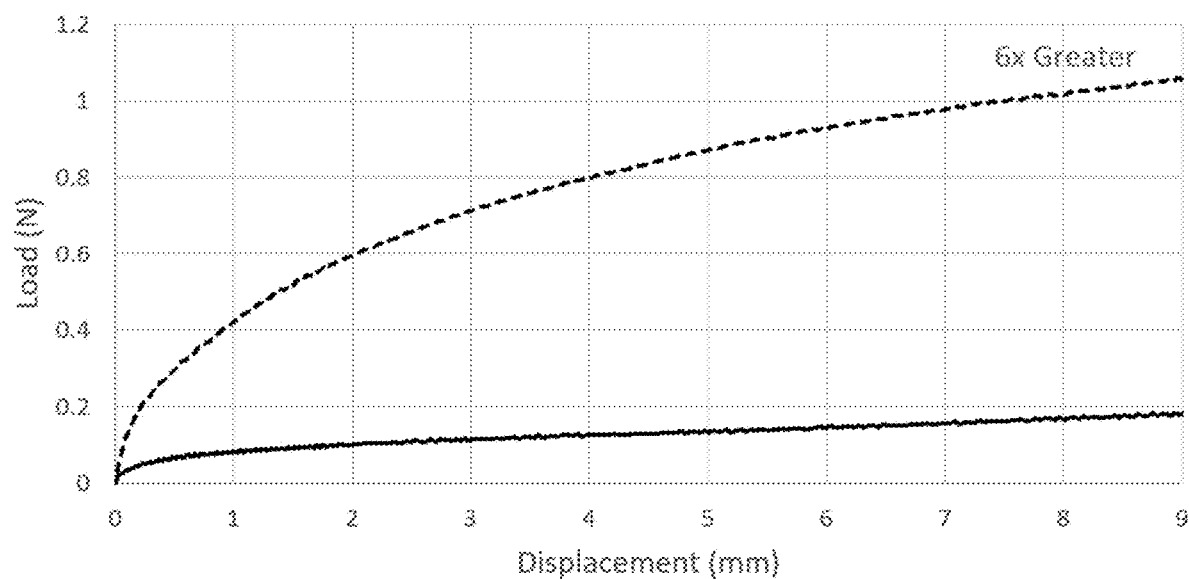
FIG. 1 illustrates a comparison of the resistance to deformation of the inventive starch dough compared to a commercial sample.

Unless herein defined otherwise, all technical and scientific terms used herein generally have the same meaning as commonly understood by one of ordinary skill in the art to which this invention belongs. The definitions herein described may or may not be used in capitalized as well as singular or plural form herein and are intended to be used as a guide for one of ordinary skill in the art to make and use the invention and are not intended to limit the scope of the invention. Mention of trade names or commercial products herein is solely for the purpose of providing specific information or examples and does not imply recommendation or endorsement of such products.

As used in the description of the invention and the appended claims, the singular forms "a," "an," and "the" are intended to include the plural forms as well, unless the context clearly indicates otherwise.

The term "consisting essentially of" excludes additional method steps or composition components that substantially interfere with the intended activity of the methods or compositions of the invention and can be readily determined by those skilled in the art (e.g., from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms in alternative forms of the disclosed embodiments.

The terms "container" or "package" as used herein refers to any article, receptacle, or vessel used for storing, dispensing, transferring, packaging, portioning, or shipping various types of products, objects, or items (e.g., food and beverage products). Specific examples of such containers include boxes, cups, jars, bottles, plates, dishes, bowls, trays, cartons, cases, crates, cereal boxes, frozen food boxes, milk cartons, carriers and holders (e.g., egg cartons, 6-pack holders, boxes, bags, sacks), lids, straws, envelopes, and the like.

The term "effective amount" or "effective time" refers to such amount or time as is capable of performing the function(s) of the compositions or methods for which an effective amount or time is expressed. As is pointed out herein, the exact amount or time required will vary from process to process, depending on recognized variables such as the compounds employed and various internal and external conditions observed as would be interpreted by one of ordinary skill in the art. Thus, it is not possible to specify an exact "effective amount" or "effective time" though preferred ranges have been provided herein. An appropriate effective amount or time may be determined, however, by one of ordinary skill in the art using only routine experimentation.

The term "fiber" as used herein refers to a plant-derived complex carbohydrate generally forming threads or filaments, often categorized as either water soluble or water insoluble, which as a class of natural or synthetic materials, have an axis of symmetry determined by their length-to-diameter (L/D) ratio. Fibers with higher L/D ratios tend to provide greater reinforcing strength to a composite material. Fibers may vary in their shape such as filamentous, cylindrical, oval, round, elongated, globular, the like, and combinations thereof. Their size may range from nanometers up to millimeters. As an additive in a latex film, for example, fibers may serve as a filler or reinforcing material that provides dimensional stability and changes in texture to the final product. Natural fibers are generally derived from substances such as cellulose, hemicellulose, lignin, pectin, and proteins. Tree fibers, for example, are often chemically pulped to remove many non-cellulosic fiber components and form a cellulose-rich fiber composition that is used to make commercial paper and paperboard. Fibers from soft and hardwood trees are commonly used to make most of the paper and paperboard products sold in markets today. Some agricultural crops are grown specifically for their high-strength fibers such as flax, sisal, hemp, linen, cotton, coir, and jute. However, fibers from agricultural residues such as straw, onion, and artichoke are normally discarded or left in the field and may provide a more sustainable source of fiber for use in manufacturing products containing a fiber component.

The term "matrix" as used herein refers generally to a viscous medium in which fiber is dispersed and is also comprised of water, water soluble materials, and in some embodiments additional dispersed components.

The term "mold" as used herein refers to a hardened hollow container commonly divided into halves that when opened can be filled with a slightly excessive amount of a viscous dough or sheet of a fiber composite material. When heated, the mold can be closed upon the sheet thereby forming it into a particular shape to match the interior dimensions of the mold. The shape is set and hardened by the loss of water content from the fiber composite material.

The term "optional" or "optionally" means that the subsequently described event or circumstance may or may not occur, and that the description includes instances in which said event or circumstance occurs and instances where it does not. For example, the phrase "optionally comprising a dispersing agent" means that the composition may or may not contain a dispersing agent and that this description includes compositions that contain and do not contain a dispersing agent.

The term "sheet" as used herein refers to materials comprising the disclosed compositions that are formed into a thin sheet-like shape (e.g., thickness less than 2 mm and preferably greater than 1 mm) of sufficient width so as to exceed the dimensions of the mold minimally in an amount sufficient to essentially completely fill the mold and ensure the mold is not underfilled. For example, the width of the mold might be exceeded by about 10%, about 20%, about 30%, or about 40% and the length of the mold might be exceeded by about 10%, about 20%, about 30%, or about 40%. The sheet material is dried as further described herein to a desired moisture content and is sufficiently flexible such that it can be rolled into sheet rolls for storage or convenience in handling.

The term "starch dough" as used herein refers to any composition having at least one starch as a component and forming a matrix having stability sufficient to be used in molding containers and in some embodiments other articles of manufacture.

Novel compositions and methods of making such compositions generally for use to form containers and other articles are herein described. This invention comprises a viscous composition of one or more types of fiber dispersed in a matrix. During formation of the composition, a base level of moisture must be maintained to ensure the fibers are properly dispersed within the matrix. A certain amount of moisture is needed to first disperse the fiber within the matrix (e.g., about 51 to about 60%). The matrix is generally comprised of at least one of each of the following components: an optional dispersant, starch, and a filler as further described below. The composition has a base moisture content, typically in the range of about 10 wt % (e.g., 10 wt %) to about 60 wt % (e.g., 60 wt %). If the base moisture content is too high, the composition may separate into its components parts (e.g., fiber and matrix) and become sticky thereby rendering it unusable for subsequent processing. It is therefore important to properly maintain the moisture content. The particular moisture content is adjusted and depends on the desired subsequent processing steps as discussed in more detail below. Maintaining the moisture content of the composition at the disclosed levels allows shortened cycle times (e.g., about 5 to about 10 sec). The compositions and methods of the invention allow the fiber component to remain essentially evenly distributed throughout the matrix without undesirable agglomeration or separation.

In embodiments, the composition comprises at least one fiber component, at least one optional dispersing agent, at least one starch component, and at least one filler component. In some embodiments, the starch component(s) may be selected to act as a dispersing agent (e.g., starches, such as those from corn, potato, and/or wheat). In such cases, a separate dispersing agent would not be necessary. Pre-gelatinized starches are generally cold water soluble and may also form a viscous matrix without the need for heating. In embodiments, moisture-repelling agents may also be added to provide enhanced moisture resistance.

The fiber component is generally a fiber selected from any number of plant-derived complex carbohydrates such as, for example, straw or other waste products. In embodiments, a fiber component such as fibers from crop waste can be partially or wholly substituted in the formulation of the invention to create a more sustainable product having a lower environmental footprint than conventional fiber-based products. Lignocellulosic fibers separated and prepared by chemically and/or mechanically separating such fibers from, for example, wood (e.g., hardwood or softwood or combinations), fiber crops (e.g., sisal, hemp, linen, the like, combination thereof, etc.), crop waste fibers (e.g., wheat straw, onion, artichoke, other underutilized fiber sources, the like, combinations thereof, etc.), and waste paper to make pulped fibers where soluble material has been removed from the fiber are preferred. However, it should be appreciated that any type of fiber known in the art may be utilized for use in the invention. The fiber component is present in the composition in an amount ranging from about 5 wt % (e.g., 5 wt %) to about 45 wt % (e.g., 45 wt %), or from about 5 wt % (e.g., 5 wt %) to about 15 wt % (e.g., 15 wt %), from about 5 wt % (e.g., 5 wt %) to about 25 wt % (e.g., 25 wt %) or from about 10 wt % (e.g., 10 wt %) to about 15 wt % (e.g., 15 wt %). Preferred fibers are natural fibers, more preferred are pulped fibers greater than about 0.5 mm (e.g., 0.5 mm) in length, and most preferred are pulped fibers with fiber lengths greater than about 2 mm (e.g., 2 mm) in length.

Fibers having a length less than about 0.5 mm may also be used but generally will act as a filler rather than contributing to the strength of the final product if the aspect ratio is also low. For example, a 0.5 mm length fiber with a diameter of 0.001 mm has an aspect ratio of (L/D or 0.5/0.001=500) 500 which could be a reinforcing fiber. A 0.5 mm length fiber with a diameter of 0.10 mm has an aspect ratio of 5 and acts more as a filler. Spherical particles may also be considered fillers and generally have an L/D or aspect ratio of approximately 1. Softwood fibers generally have an L/D ratio ranging from about 60 to about 130 and are reinforcing fibers. Nanofibers may only be 1 micron long but may have a very thin diameter, so they can have an L/D ratio of over 200 and are very good at reinforcement even though they are very short. Wood flour (e.g., ground or milled wood) may have an aspect ratio of about 3 to about 4 and mostly would act as a filler. Materials with an aspect ratio of about 10 to about 20 may give some reinforcement but not help to significantly improve strength so may have properties of both a filler and a reinforcement.

The dispersing agent provides a mechanism for the fiber component to distribute throughout the matrix and create a viscous starch dough in combination with the other components of the disclosed composition. The dispersing agent is present in the composition in an amount ranging from about 0.5 wt % (e.g., 0.5 wt %) to about 10 wt % (e.g., 10 wt %), or from about 0.5 wt % (e.g., 0.5 wt %) to about 5 wt % (e.g., 5 wt %), or from about 0.5 wt % (e.g., 0.5 wt %) to about 5 wt % (e.g., 5 wt %). Pulped fibers tend to agglomerate and form clumps in the matrix. Addition of a dispersing agent to the composition along with optional physical shear effectively separates the fibers into single fibers that are uniformly distributed throughout the matrix. Properly dispersed fibers strengthen and reinforce the matrix. Fiber clumps are not desirable and do not provide strength or reinforcement to the matrix or the molded product. The ability of the dispersing to sufficiently distribute the fiber component throughout the matrix is dependent on using relatively small quantities of water as further discussed herein to create a starch dough with sufficiently high viscosity for use in the methods of the invention.

Viscosity is measured by means known the art. For example, a texturometer may be used to measure characteristics of the force response resulting from the mechanical properties (e.g., resistance, texture analysis, texture profile analysis, etc.) of the starch dough composition. Such mechanical properties correlate to specific sensory textural attributes and impact the performance of the composition in forming articles as well as the quality and performance of those articles in various applications. The preferred resistance may be measured, for example, by inserting a ½ inch probe to a depth of 35 mm in a container of the starch dough composition is from about 150 grams (e.g., 150 grams) to about 300 grams (e.g., 300 grams). It should be appreciated that the upper limit for the viscosity range is dependent on the compressive force of the molding equipment. Stiffer dough typically holds it shape better when the molded part is demolded (i.e., removed from the mold). A preferred resistance is greater than about 170 grams (e.g., 170 grams) and up to about 300 grams (e.g., 300 grams), or greater than about 200 grams (e.g., 200 grams or greater), or greater than about 300 grams (e.g., 300 grams), or greater than about 600 grams (e.g., 600 grams or greater), or greater than about 800 grams (e.g., 800 grams or greater). Examples of dispersing agents include polyvinyl alcohol (PVOH), pregelatinized starches, carboxymethyl cellulose and its derivatives, hydroxymethyl cellulose and its derivatives, water soluble viscosity modifiers including plant gums. Preferred dispersing agents include those that provide an optimal balance of price and function and are naturally-derived. PVOH, for example, is synthetic and rather expensive but provides strength and good oil resistance. Most preferred are pregelatinized starches because they are cost effective, readily available, and renewable.

The starch component acts as a binding agent to ensure the fiber component remains evenly distributed throughout the matrix and may be derived from a variety of agricultural sources and commodities. The starch component is present in the composition in an amount ranging from about 5 wt % (e.g., 5 wt %) to about 30 wt % (e.g., 30 wt %), or from about 5 wt % (e.g., 5 wt %) to about 25 wt % (e.g., 25 wt %), or from about 10 wt % (e.g., 10 wt %) to about 30 wt % (e.g., 30 wt %). For example, binding agents derived from natural sources and starches including PVOH and proteins from corn, wheat, and potato starches may be used as the starch component. In the disclosed composition, the starch component is distributed essentially throughout the matrix and contributes to the desired level of high viscosity. Starch is comprised of amylose and amylopectins that are high molecular weight and soluble in water. When granular starch is heated in water, the granules swell and absorb water. The high molecular weight starch polymers disperse and increase viscosity in water. Adding more starch tends to increase the concentration of the starch polymers solubilized in the water thus increasing viscosity. In addition, the disclosed formulations have a high starch content which improves their biodegradation rate in most environments. It should be understood that high starch content is a relative term and, in the present invention high starch content refers to a material comprised of a significant amount of starch compared to other high fiber materials such as paper that may contain less than 1% starch. It is also well known in the literature that starch is easily biodegradable compared to fiber.

The filler component is an inorganic mineral compound which aids in stabilizing the starch dough product. Fillers are typically inexpensive mineral-based powders (e.g., having a fiber length of less than about 0.25 mm) that aid in lowering the cost of the final product or process to form the final product as well as confer some useful properties (e.g., stiffness, color, printability, ink retention, hydrophilicity, heat resistance, etc.). Fillers generally tend to increase the stiffness or modulus of composite materials, and, in some cases, fillers may increase whereas in other cases may decrease the tensile strength of materials. It should be appreciated that a skilled artisan would select the appropriate fillers for the intended application. The filler component is present in the composition in an amount ranging from about 5 wt % (e.g., 5 wt %) to about 65 wt % (e.g., 65 wt %), from about 5 wt % (e.g., 5 wt %) to about 45 wt % (e.g., 45 wt %), or from about 5 wt % (e.g., 5 wt %) to about 30 wt % (e.g., 30 wt %), or from about 5 wt % (e.g., 5 wt %) to about 25 wt % (e.g., 25 wt %), or from about 10 wt % (e.g., 10 wt %) to about 30 wt % (e.g., 30 wt %). Examples of suitable filler components include at least one of sand, crushed rock, bauxite, granite, limestone, sandstone, glass beads, mica, clay, alumina, silica, fly ash, fumed silica, kaolin, glass microspheres, hollow glass spheres, porous ceramic spheres, gypsum mono- and dihydrates, insoluble salts, calcium carbonate, magnesium carbonate, calcium hydroxide, calcium aluminate, magnesium carbonate, titanium dioxide, talc, ceramics, pozzolans, zirconium compounds, xonotlite, silicate gels, lightweight expanded clays, perlite, vermiculite, hydraulic cement particles, pumice, zeolites, exfoliated rock, ores, natural minerals, metallic particles, or metallic flakes. Preferred fillers are approved for use with food contact (e.g., calcium carbonate and clays commonly used in food packaging) and would be appropriately selected by one skilled the art.

The composition is formed through a series of steps which preferably includes gelatinizing the starch component at least partially by applying heat via microwaving or extrusion or with an internal batch mixture (e.g., Banbury mixer) or a paddle mixer, for example, prior to subsequent steps to create containers or articles with the starch dough product. This gelatinizing process ensures the produced starch dough product has desirable viscosity and assists in uniform fiber distribution throughout the matrix. In a preferred embodiment, virtually all of the starch within the composition is gelatinized to prepare the starch dough product for subsequent steps to create a container or other article surprisingly without the need for additional heat application to further gelatinize the starch. The starch dough reaches its glass transition point so that it can flow and conform to the shape of the mold (a small amount of heat is sometimes needed to make the article sufficiently pliable and moldable, as determined by one having skill in the art) and to drive-off the small amount of remaining moisture so the molded article holds its shape and form during the creation of such containers or articles. Surprisingly, it was found that pre-gelatinizing the starch further aids in keeping the matrix from separating into its component parts or agglomerating, which are both undesirable side effects.

In embodiments, a method for making the disclosed composition includes converting the fiber into a form amenable to mixing with the other components of the composition. For example, the method may include shredding the fiber component into strips, chipping the fiber, subjecting to known pulping methods (e.g., mechanical, thermomechanical, chemical, chemimechanical, organosolv, etc.). It should be appreciated that the fiber may be prepared by any methods known in the art as selected according the particular fiber selected and specifications desired by a skilled artisan. The prepared fiber is then mixed with the dispersing agent. Mixing can be accomplished by ways known in the art such as, for example, a mixer that provides shear (e.g., paddle mixer or melt mixer), Banbury mixer, or extruder. Mixing should be performed to allow sufficient mixing of the fiber component and the dispersing agent. The particular mixer and speed may be adjusted by a skilled artisan to achieve sufficient shear to separate and disperse the fibers according to the particular mixer being utilized. A main consideration of the mixer chosen is that it should not significantly degrade the properties (e.g., decreasing average fiber length) of the fiber(s). Optimum effective times for mixing may vary depending on the chosen mixer or mixing apparatus. Sufficient mixing is understood by, for example, inspecting the composition for clumps, agglomeration, or specks of undispersed fibers. If such imperfections are observed, the mixing conditions must be adjusted.

Upon sufficient mixing, the starch component is added and mixed at a sufficient and optimum speed as determined by the operator to achieve incorporation of the starch component(s) into the mixture. For example, such mixing may be performed at medium speed for an additional effective time of at least about 5 min. The particular mixer and speed may be adjusted by a skilled artisan to achieve sufficient mixing to disperse and incorporate the fibers into the mixture according to the particular mixer being utilized. Effective times for mixing (e.g., about 1 to about 5 min, or from about 1 to about 10 min, or from about 5 to about 20 min) and speeds (e.g., about 50 to about 100 RPM, or from 75 to about 200 RPM, or up to 300, 400, or 500 RPM) may be adjusted according to the particular conditions. Upon sufficient incorporation of the starch component, the combination of mixed fiber, dispersing agent, and starch are heated for an effective time and temperature to sufficiently cause the starch component in the mixture to gelatinize and swell. The effective temperature and time varies depending on the particular type of starch component(s) used. Different types of starches have different gelatinization temperatures. It is not generally necessary to achieve complete gelatinization, and partial gelatinization is sufficient. The viscosity of the starch dough composition as further disclosed herein is the factor most affected by starch gelatinization, the level of gelatinization is important to achieve the desired viscosity and facilitate thorough dispersion of the fiber component. After the initial starch mixture is sufficiently gelatinized, an amount of the optional filler component is added to the viscous mixture and mixed with guidelines as discussed herein for mixing. This mixture, upon sufficient mixing, is then heated for an effective time and mixed again as needed to eliminate clumping, agglomeration, speck formation, etc. It should be appreciated that a skilled artisan would be able to determine if the mixing would need to be paused to ensure the full volume of the respective mixture was in the proper location and not displaced to other areas of the mixing apparatus. The resulting final starch dough may then be separated into usable portions and used for subsequent processing or optionally stored for subsequent processes to create containers and articles. In commercial operations, for example, the starch dough may be rolled into sheets with calendaring equipment and not portioned for later use.

In embodiments, waste material (e.g., trimmings from the outer edges of plates and bowls) from molding processes such as those disclosed below are recycled and incorporated into the starch dough composition during any of the mixing steps to reduce waste and make the process more environmentally friendly and cost efficient. The presence of such waste material was not found to have a detrimental effect on products, provided that the moisture content is controlled as described herein.

In light of the principles disclosed for the compositions and methods of making the starch dough products, the materials can be used to create a variety of containers and other articles. The disclosed invention also includes processes for producing (e.g., small batch or mass producing) biodegradable containers directly from the disclosed viscous starch dough compositions. For example, the starch dough compositions may be used to form sheets or films which are, in turn, cut and formed (e.g., bending, folding, or rolling) into a variety of containers and other articles of manufacture (e.g., take-out containers, clamshells for hamburgers and sandwiches, food tray, other disposable containers and packaging for the fast food and other industries). The dough is rolled into a sheet for the sheet embodiments as further described herein. Once the dough is rolled into a sheet, it is further dried to a much lower moisture content (e.g., about 12% to about 15%). The desired moisture content is important because excess moisture prolongs the amount of time needed in the mold to solidify the part. For a shallow draw item, for example, from about 10% to about 25% (e.g., 10% to 25%), or from about 10% to about 20% (e.g., 10% to 20%), or from about 12% to about 15% (e.g., 12% to 15%) moisture content is sufficient to render the sheet sufficiently flexible. It can then be molded for a shortened cycle because the excess moisture has already been removed. At these low moisture levels, it generally takes a few seconds to remove the remaining water to solidify and harden the molded part.

In embodiments, the starch dough product is used to create a starch dough sheet. The disclosed viscous composition is removed from the mixer (or brought in from storage, etc.) and deformed and rolled or pressed into thin sheets. The composition generally has sufficiently low stickiness that it can be easily shaped and rolled or calendared into thin sheets without adhering to the equipment. In addition, due to the high viscosity of the composition, the fiber component within the composition is unable to agglomerate or separate from the matrix material. The sheets have a considerable surface area exposed that facilitates rapid drying. The thin sheets of the starch dough composition are able to be rolled-up and stored in a manner similar to paper. The rolls can be mass produced using, for example, conventional calendaring equipment as well as other equipment used in the papermaking industry as would be known by one having skill in the art. The thickness of the sheets range from about 1.5 mm (e.g., 1.5 mm) to about 3 mm (e.g., 3 mm), with a preferred thickness from about 2.5 mm (e.g., 2.5 mm), a more preferred thickness of about 2 mm (e.g., 2 mm), and a most preferred thickness of about 1.5 mm (e.g., 1.5 mm).

The moisture content of the starch dough sheet may be optimized for subsequent processing (e.g., molding into containers or other articles) by determining the minimal amount of moisture needed to make the sheet flexible and moldable to prevent undesirable tears and other defects. High levels of moisture, for example, generally causes the sheet to become weak and increases the likelihood of tearing. In addition, high moisture content may also lead to the formation of undesirable levels of steam within the mold cavity which may distort or damage the molded article if the higher level of steam releases violently. By optimizing the moisture content, the minimal amount of moisture remaining at the start of the molding process will need to be removed from the final product by heating the mold thereby minimizing cycle times and potential component damage as well as maximizing production rates. The moisture content of the sheet is adjusted prior to being placed into a mold such that it becomes sufficiently flexible to be shaped in the mold such as a plate or food tray (sometimes referred to as "shallow-draw" molds). The moisture content of the sheets can be adjusted by any means known in the art such as by adding a mist or spray of water to increase the moisture content or by heating to reduce the moisture content. The desired final moisture content of the sheet prior to subsequent molding steps is preferably below about 20 wt % (e.g., 20 wt %) or below about 15% (e.g., 15 wt %) or below about 12% (e.g., 12 wt %).

Optimal moisture content is critical so the sheet has the proper amount of flexibility for molding purposes while avoiding issues of excessive steam and moisture to make the venting step efficient. It is preferable that flexural strength of the sheet is at least about 50% (e.g., 50%) below the flexural strength of the finished molded article. One skilled in the art would be able to balance the desired flexibility (e.g., stretchability and resistance to tearing) and green strength (i.e., wet strength) of the sheet to ensure it conforms properly to the mold. Moisture levels of about 10% to about 15% are preferable to render the sheets flexible so they can be molded (e.g., compression molded) without breaking or cracking. Excessive moisture may also cause the starch sheet to stick to the mold and cause discoloration of the produced item and oxidation of the mold surface. Optimizing the moisture content of the sheets also avoids bubbling and distortion of the sheet inside the mold and reduces the time needed to sufficiently dry and solidify the molded item. To aid in efficiently releasing the moisture while forming the container or article, the temperature of the mold is preferably held higher than about 80° C. (e.g., 80° C.), more preferably higher than about 140° C. (e.g., 140° C.), and most preferably from about 140° C. to about 190° C. (e.g., 140° C. to 190° C.). It is important for the moisture content of the starch dough composition to be adjusted prior to placement in the mold to avoid the added commercial expense and production time required to heat the mold to higher temperatures and hold the composition for longer times for sufficient drying. In addition, it is desirable to keep mold temperatures lower to avoid forming a foam in the final product to prevent the starch dough composition from adhering to the mold surface.

The low moisture content of the sheet placed inside the mold should be determined by a skilled artisan to ensure it is sufficient to make the starch dough sheet amenable to the desired molding process (e.g., compression molding). Compression molding, for example, is typically a multi-step molding process. After placing the starch dough sheet having an optimized moisture content on a mold, the initial compression step heats the sheet and turns the moisture trapped inside the mold into steam. The mold is opened to allow the steam to escape. This moisture release step often leads to distortion in the molded container or article. A subsequent compression step (often immediately after the steam release, but a time delay, for example, of about 7 sec, about 5 sec, or about 3 sec may also be used) allows the container or article inside the mold to be reshaped and given a smooth final finish while it is still pliable (i.e., above the glass transition temperature). It is also possible under heat and pressure present in a molding process to convert the starch sheet into a thermoplastic material which flows such that it fills gaps and forms a smooth surface on the molded container or article (e.g., plate or food tray). This flow effectively removes folds or pleats that form as the starch sheet is compressed into a plate or food tray so a smooth, professional finish is obtained when the heated surfaces of both the upper and lower mold compress onto the starch sheet directly preferably without a gap between the starch sheet and the heated mold surfaces. If desired, a coating (e.g., paraffin wax, polyethylene wax, polylactic acid film, moisture barrier emulsion sprays, the like, and combinations thereof) may also be applied to the final molded product to provide, for example, moisture and/or oil resistance. It should be appreciated that this compression molding process is amenable to making food containers such as, for example, shallow draw molds. Containers such as cups and bowls (sometimes referred to as "deep draw" containers) typically require a different process to prevent unacceptable tears and defects from the sheet being stretched too far to accommodate the dimensions of such containers. A process to produce this second type of container is discussed below.

In embodiments, the starch dough product is deposited into a mold (rather than being rolled into a sheet) where compressive force is applied to force the starch dough to flow into and fill the mold to create an article such as a food or beverage container. The viscous composition can be deposited into a mold and pressed using the compression force necessary to make the dough flow and fill the mold. The high viscosity of the starch dough composition is not amenable to measuring its viscosity with a viscometer or rheometer, for example. A probe is used to measure penetration resistance as discussed in more detail above. The compositions made using the methods of the invention have sufficiently low stickiness that the mold can be opened without the dough sticking or deforming the shape of the molded article. The starch dough composition may have a moisture content as high as about 60 wt % (e.g., 60 wt %), preferably less than about 60 wt % (e.g., 60 wt %), and most preferably below about 51 wt % (e.g., 51 wt %). Once the dough fills the mold, it is left open to allow the dough to dry under ambient conditions until the moisture content falls below about 20 wt % (e.g., 20 wt %), preferably below about 15 wt % (e.g., 15 wt %), and more preferably below about 12 wt % (e.g., 12 wt %). As the dough fills the mold, it is important to ensure it does not stick to the mold surface, which may happen if the moisture content is too high (and is also partially dependent on the mold surface finish). The moisture content of the dough in the mold can be adjusted by any means known in the art such as by adding a mist or spray of water to increase the moisture content or, for example, having a heat source and/or an extensive conveying system to allow sufficient time to reduce the moisture content through evaporation. The partially dried and pliable item is placed inside a heated mold. The temperature of the mold is greater than about 90° C. (e.g., 90° C.) but preferably above about 140° C. (e.g., 140° C.), and more preferably from about 140° C. to about 190° C. (e.g., 140° C. to 190° C.). The molding step is preferably less than about 15 seconds (e.g., 15 seconds or less) but more preferably less than about 10 seconds (e.g., 10 seconds or less) or less than about 5 seconds (e.g., 5 seconds or less) to minimize the cycle time. Due to the low moisture content and viscous nature of the starch dough composition, the fiber remains essentially evenly dispersed (i.e., without agglomeration occurring) throughout the molding process.

The molded item does not stick to the mold once it opens due to the low initial moisture content prior to being placed into the mold. The molded item can be ejected from the mold as a finished product or it can be coated (e.g., paraffin wax, polyethylene wax, polylactic acid film, moisture barrier emulsion sprays, the like, and combinations thereof) to provide moisture and/or oil resistance. There is typically no waste material or trimmings to recycle since the article is initially molded approximately to its final dimensions as it is placed into the mold. The final thickness of articles molded in this fashion, though dependent on the mold design, is typically in the range from about 0.5 mm to about 1.5 mm (e.g., 0.5 mm to 1.5 mm).

An example of a commercial version of the disclosed molding process would comprise, for example, an array of clamshell bottom or lower molds mounted on a conveyor belt. For instance, the conveyor belt could be fitted with a row of four molds wide with additional rows lined up along the entire length of the conveyor belt. Premade starch dough balls would be dropped into each of the bottom molds and a press equipped with a matching row of upper half or top molds would mold the starch dough balls into an article. At this stage of initially forming the shape of the article, the mold is unheated. The dough ball deposited in the bottom mold is compressed by the matching top mold as the press moves through the compression cycle with the bottom mold in the molding positions and the top mold is lowered into contact with the bottom mold. The compression force causes the dough ball to flow and completely fill the mold cavity within the closed mold. The mold cavity has a thickness that is optimal for the article being manufactured (e.g., a clamshell cavity may have a thickness ranging from about 0.5 mm to about 1 mm or 1.5 mm depending on the desired specifications). Once the mold is closed and the mold cavity is completely filled with the dough, the mold is opened, preferably by raising the top half of the mold. In typical operations, it is important that the dough release cleanly from the top mold so that the article is not distorted or torn when the top mold is lifted. The release properties of the mold can be optimized by designing the mold properly by mold geometry, mold surfacing, and by incorporating positive air pressure through vents that can assist the separation and release of the molded article.

The mold is then opened and the bottom mold with the molded dough are then conveyed through a drying tunnel to lower the moisture content as disclosed herein to facilitate the drying process and minimize the costs associated with drying (e.g., to a moisture content below 15%). The bottom molds containing the dried articles are then conveyed to the respective matching row of upper half or top molds which are optionally heated to a temperature as disclosed herein to put a finishing quality on the article and solidify it into its final shape and finish. In addition, the bottom molds can also be designed with a vacuum network to ensure the dough does not release from the bottom mold during mold separation. Other techniques may also be used effectively to promote the release from the upper mold such as incorporating release agents in the dough composition and optimizing the moisture content. Once the top mold is lifted and clears the bottom mold, the bottom mold can continue to be conveyed and the cycle repeats itself. In many cases, the mold opens slightly for a short time (e.g., fraction of a second) to release steam created by the small amount of moisture in the starch dough composition and then closes a final time to completely dry the sample and solidify the shape of the article. The mold is then opened and the finished article is ejected with a mechanism such as a short burst of air.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

For the following examples, polyvinyl alcohol (PVOH, Celvol 504) was purchased from Celanese (Dallas, Tex.). Native potato starch (Pencook 10) was provided by Penford Corporation (Englewood, Colo.). Calcium Carbonate was provided by ECC International (Sylacauga, Ala.). Hardwood fiber (HWF) sheets of pulped and pressed fiber was provided by Georgia Pacific (Atlanta, Ga.). A stock solution of 5% PVOH was made by adding 25 g of PVOH powder to a 1 liter Erlenmeyer flask containing 475 g of deionized water. A stir bar was placed inside the flask and the solution was constantly stirred at approximately 90° C. until the PVOH was completely dissolved.

Example 1

Starch Dough Composition. The process for preparing the composition incorporated water, PVOH, Fiber-HWF, Starch, and $CaCO_3$ in two different ratios as shown in Table 1. HWF (30 g) was shredded into approximately 3 cm strips and placed into 5 liter mixing bowl (Hobart model N50-60, Troy, Ohio). PVOH stock solution (120 g) was weighed and added to the mixing bowl. The mixer was turned to the lowest mixing speed and mixed for approximately 10 min. The mixer was stopped and 20 g of potato starch was added before mixing an additional 5 min at medium speed. The mixture was removed from the mixing bowl and collected on a plastic weighing tray. The tray was then placed inside of a 1.65 kW microwave oven for 40 sec on high. The microwaving step effectively caused the starch component to gelatinize and swell. After cooking, the hot viscous mixture was placed back into the Hobart mixing bowl along with 40 g of $CaCO_3$. The mixture was mixed for 5 minutes using medium mixing speed. Mixing was paused only to scrape down the sides of the mixing bowl before resuming the mixing step. The mixture was then placed back into the plastic weighing boat and microwaved an additional 40 sec on the high setting. The hot mixture was returned to the Hobart mixing bowl and mixed a final 5 min using medium mixing speed. The mixing step was paused after 2 min to scrape down the sides of the mixing bowl before resuming. The resulting starch dough mixture was removed from the mixing bowl and separated into portions (e.g., 30 g and 45 g for these examples, though any usable portion size may be used) that were rolled into balls and placed in plastic bags to ensure the dough retained its moisture and did not dry out until needed. It should be noted that a commercial process could use, for example, a Banbury mixer, melt mixer, or extruder to make the disclosed composition of starch dough.

TABLE 1

| Component | Formulation 1 | Formulation 2 |
| --- | --- | --- |
| Water | 53% (53 g) | 54% (54 g) |
| PVOH | 3% (3 g) | 3% (3 g) |
| Fiber-HWF | 11% (11 g) | 14% (14 g) |
| Starch | 11% (11 g) | 10% (10 g) |
| $CaCO_3$ | 22% (22 g) | 19% (19 g) |

Example 2

Sheet Formation. A composition of the starch dough mixture was prepared as described in Example 1 and separated into portions of 45 g each. Each ball was sandwiched between two sheets of 12"×12" polyester film (e.g., Mylar® available from DuPont, biaxially-oriented polyethylene terephthalate (BOPET) film, polyethylene terephthalate (PET) film, or any other suitable film may also be used) and placed between the platens of a hydraulic press. Spacers (1 mm) were placed between the polyester film sheets and located at each corner. The press was closed using a compressive force of 9,000 psi (62 MPa). This level of compressive force effectively deformed the ball into a flat starch dough sheet. Due to the high viscosity of the matrix material, the HWF flowed with the matrix without separating or forming clumps. One sheet of polyester film was peeled off so that the newly formed starch dough sheet could air-dry overnight at room temperature and eventually be peeled away from the second polyester film sheet. This step is distinctly important because pre-gelatinization allows for the product to become extremely viscous thereby ensuring that the fiber moves along with the fluid matrix during the molding step rather than separating out or forming clumps of fiber.

Example 3

Molded Plate. To make a molded plate, the dried sheet formed in Example 2 was rehydrated to a limited moisture content (MC). In this example, the sheet was rehydrated to a final MC of 15%. At 15% MC, the sheet lost its stiffness and became pliable thus allowing the sheet to conform to the shape of the plate mold. By compression molding the sheet using a heated (190° C.) plate mold, the moisture quickly evaporated and the shape solidified into a stiff plate with mechanical properties similar or better than those of paper plates. The mold was designed so that the excess material of the sheet was trimmed off when the mold closed. The compression molding step may be designed with a double clamping action. In other words, after the initial closing step with a 5 sec closure dwell time, the moisture within the molded plate was converted into steam and trapped within the mold. A rapid opening action to vent the steam (the rapid venting caused the shape of the plate to distort) followed by a second compression step was necessary to allow the trapped steam to vent and restore the desired shape of the plate before it solidified.

Example 4

Comparative Example. This example illustrates the relative viscosity of the dough (indicators of batter viscosity and not true viscosity) of the invention compared to that of a commercially available starch-based product. The dough viscosity of the inventive composition was surprisingly found to be roughly 6-fold greater than that of the commercial sample. The test was performed by measuring the penetration resistance of a 0.5 inch rounded rod into the respective dough materials. At a penetration depth of 8 mm, the penetration resistance for the commercial dough sample was 0.166 Newtons compared to 1.033 Newtons for the dough of the invention as shown in the graph of FIG. 1 where the solid line indicates data for the inventive sample and the dashed line indicates data for the commercial sample. Instron Model 55R44502 with Merlin Series IX software, 100 Newton load cell, 3-point flexural testing attachment (Canton, Mass.) was used for the testing. The batter was placed into a 250 ml glass beaker (filled all the way to the top). The testing probe was plunged 1 inch into the batter at 10 mm/s and then withdrawn and the positive peak force was recorded. The beaker was immediately covered to avoid moisture loss for subsequent measurements.

Example 5

Figure 2:
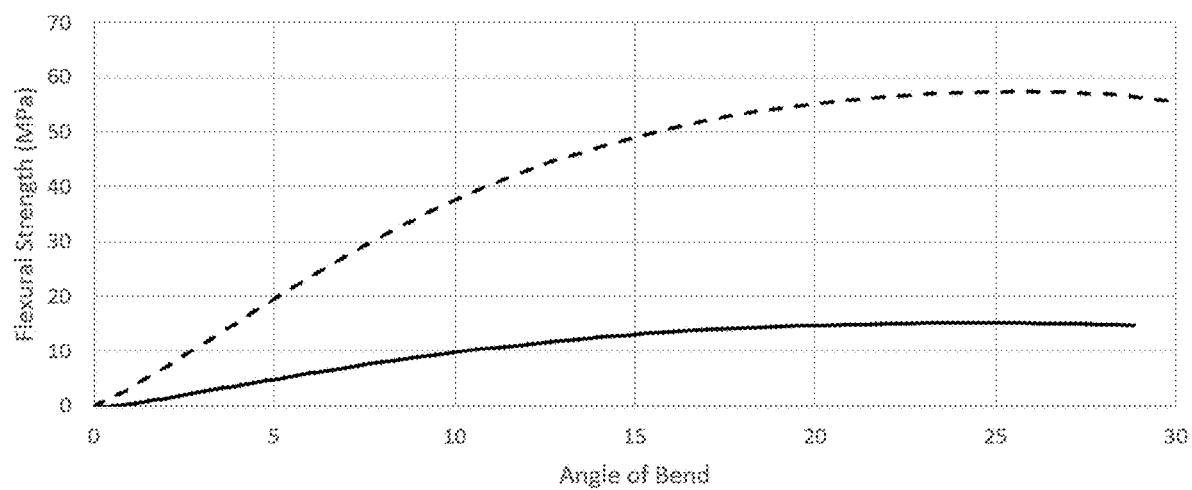
FIG. 2 illustrates a comparison of the flexural strength of a plate made from the inventive starch dough compared to a commercial pulp-molded paper plate.

Table 2 shows results comparing the tensile strength, flexural strength, and modulus of the starch composition compared to a commercial pulp-molded paper plate (comprised primarily from wheat straw fiber). Results are shown in tabular form as mean and standard deviation. The plates were cut into 1 inch strips using a band saw and stored in a sealed plastic bag until use. The flexural strength was determined using ASTM Method D 790-91 "Standard Test Methods for Flexural Properties of Unreinforced and Reinforced Plastics and Electrical Insulating Materials." The apparatus used was an Instron Model with Merlin Series IX software, 100 Newton load cell, 3-point flexural testing attachment (Canton, Mass.). During testing, the testing method lowered the crosshead on the flexural testing attachment at a rate of 25.4 mm/min and measurements were taken at 10 points/sec. FIG. 2 graphically illustrates the comparative flexural strength of the inventive starch plate (solid line) and the commercial pulp-molded paper plate (dashed line). The tensile strength and modulus were surprisingly similar. The flexural strength, though lower, was found to be acceptable for the intended use.

TABLE 2

| Measured Property | Starch Plate | Commercial Plate |
| --- | --- | --- |
| Tensile Strength (Mpa) | 11.4 ± 2.4 | 10.2 ± 1.2 |
| Flexural Strength (Mpa) | 9.9 ± 2.6 | 56.6 ± 4.1 |
| Modulus (Gpa) | 1.9 ± 0.14 | 1.1 ± 0.08 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety, including any materials cited within such referenced materials. Furthermore, the invention encompasses any possible combination of some or all of the various embodiments and characteristics described herein and/or incorporated herein. In addition the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 30%, preferably by as much as 20%, and more preferably by as much as 10% to a reference quantity, level, value, or amount.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

The claimed invention is:

1. A non-foamed dough sheet comprising:
a pulped fiber component selected from crop waste fibers, wood, fiber crops, and combinations thereof;
at least one binding agent derived from natural sources;
at least one dispersing agent;
and optionally comprising at least one filler component that is not a foaming agent;
wherein the non-foamed dough sheet is rolled from a viscous non-foamed dough composition, is not a final product, a container, or an article, is less than about 3 mm in thickness, has about 5 wt % to about 10 wt % moisture content, and contains no clumps, agglomeration, or specs of undispersed fibers.

2. The non-foamed dough sheet of claim 1, wherein the pulped fiber component has a fiber length greater than about 0.5 mm.

3. The non-foamed dough sheet of claim 1, wherein the pulped fiber component is present in an amount from about 5 to about 45 in terms of wt % of the non-foamed dough sheet.

4. The non-foamed dough sheet of claim 1, wherein the at least one dispersing agent is a water-soluble viscosity modifier.

5. The non-foamed dough sheet of claim 4, wherein the water soluble viscosity modifier is polyvinyl alcohol, pregelatinized starch, carboxymethyl cellulose or its derivatives, hydroxymethyl] cellulose or its derivatives, plant gums, or combinations thereof.

6. The non-foamed dough sheet of claim 1, wherein the at least one dispersing agent is polyvinyl alcohol present in an amount from 0.5 to about 10 in terms of wt % of the non-foamed dough sheet.

7. The non-foamed dough sheet of claim 1, wherein the at least one binding agent and/or the at least one dispersing agent is starch-derived from natural sources.

8. The non-foamed dough sheet of claim 7, wherein the starch is derived from corn, wheat, potato, or combinations thereof.

9. The non-foamed dough sheet of claim 1, wherein starch is the binding agent and/or the dispersing agent, and is present in an amount from 5 to about 30 in terms of wt % of the non-foamed dough sheet.

10. The non-foamed dough sheet of claim 1, wherein starch acts as the dispersing agent.

11. The non-foamed dough sheet of claim 1, wherein the at least one filler component is sand, crushed rock, bauxite, granite, limestone, sandstone, glass beads, mica, alumina, fly ash, fumed silica, kaolin, gypsum mono- and dihydrates, calcium carbonate, magnesium carbonate, calcium hydroxide, calcium aluminate, titanium dioxide, talc, ceramics, pozzolans, zirconium compounds, xonotlite, silicate gels, lightweight expanded clays, hydraulic cement particles, exfoliated rock, metallic particles, metallic flakes, or combinations thereof.

12. The dough sheet of claim 1, wherein the at least one filler component is comprised of fibers shorter than about 0.25 mm.

13. The dough sheet of claim 1, wherein the at least one filler component is present in an amount from about 5 to about 65 in terms of wt % of the non-foamed dough sheet.

14. A method for making a non-foamed dough sheet, the method comprising: mixing
a pulped fiber component selected from crop waste fibers, wood, fiber crops, and combinations thereof
with at least one dispersing agent,
water, and
at least one water soluble binding agent derived from natural sources to create a dispersed fiber;

and optionally adding at least one filler component that is not a foaming agent to the dispersed fiber;

mixing and heating the dispersed fiber for a sufficient time and at a sufficient temperature to create a viscous non-foamed dough composition;

portioning the viscous non-foamed dough composition, or using platens or rollers on the viscous non-foamed dough composition to create a non-foamed dough sheet that is less than about 3 mm in thickness and has about 5 wt % to about 10 wt % moisture content; and drying the dough sheet to less than about 10 wt % moisture content for storing and subsequent processing; wherein the non-foamed dough sheet is not a final product, a container, or an article, and contains no clumps, agglomeration, or specs of undispersed fibers.

15. A method of forming an article, the method comprising rehydrating the non-foamed dough sheet of claim 1 to about 15 wt % moisture, placing the rehydrated dough sheet into a heated mold, and in contact with all sides of the mold to create the article.

16. The method of claim 15, wherein the article is a container designed for food.

17. A non-foamed dough sheet prepared by mixing a pulped fiber component with water, a water-soluble binding agent, and a dispersing agent to create a dispersed dough;

adding at least one native starch component to the dispersed dough, and mixing and heating for a sufficient time and at a sufficient temperature to create a viscous non-foamed dough composition;

optionally adding a filler component that is not a foaming agent to the Viscous non-foamed dough composition to create a filled mixture;

wherein the pulped fiber component is selected from crop waste fibers, wood, fiber crops, and combinations thereof; and portioning the viscous non-foamed dough composition or the filled mixture, or using platens or rollers on the viscous non-foamed dough composition or the filled mixture to create a non-foamed dough sheet that is less than about 3 mm in thickness and has about 5 wt % to about 10 wt % moisture content;

wherein the non-foamed dough sheet is not a final product, container, or an article, and contains no clumps, agglomeration, or specs of undispersed fibers.

* * * * *